E. A. PANGMAN.
SHOCK ABSORBER ATTACHMENT FOR BICYCLES.
APPLICATION FILED JAN. 16, 1915.

1,239,035.

Patented Sept. 4, 1917.
2 SHEETS—SHEET 1.

Witnesses
Guy M. Spring.

Inventor
Everett A. Pangman.
By Richard B. Owen.
Attorney

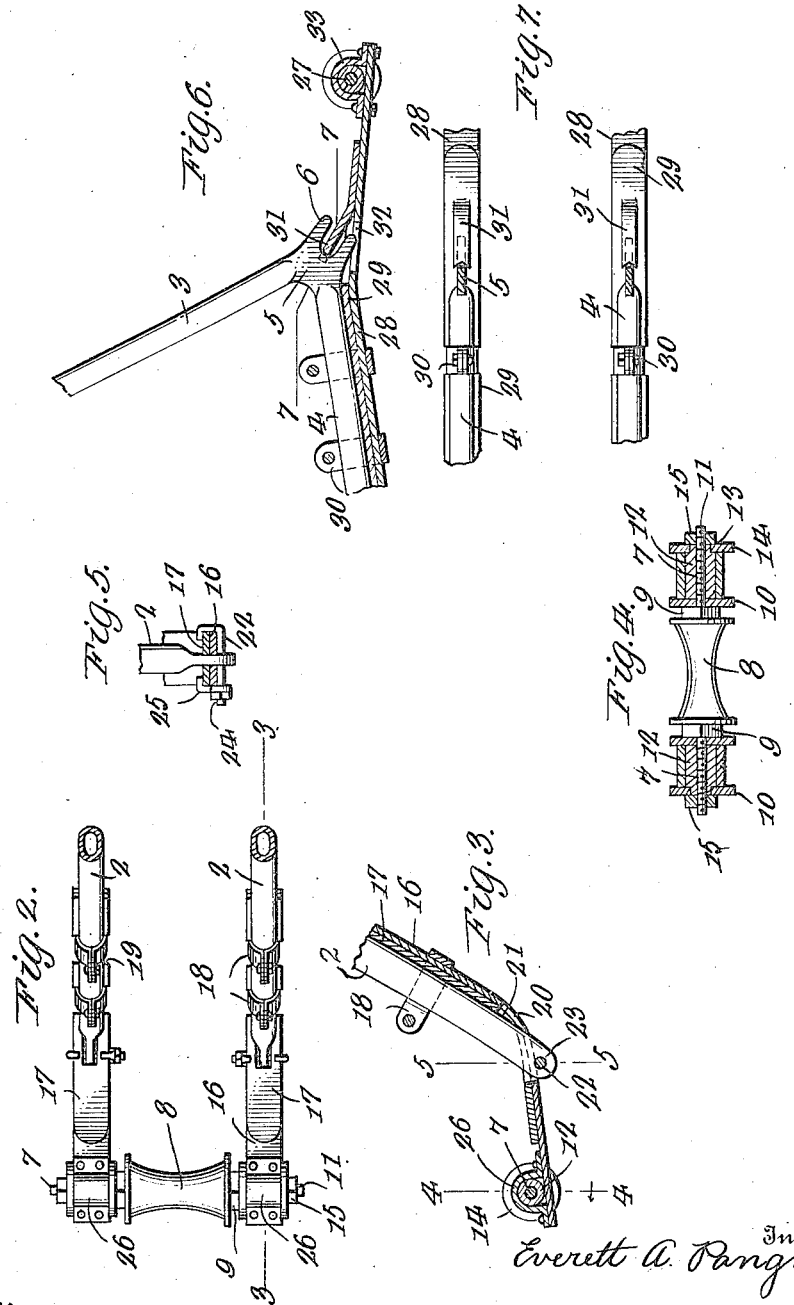

UNITED STATES PATENT OFFICE.

EVERETT A. PANGMAN, OF GILBOA, NEW YORK.

SHOCK-ABSORBER ATTACHMENT FOR BICYCLES.

1,239,035.  Specification of Letters Patent.  Patented Sept. 4, 1917.

Application filed January 16, 1915. Serial No. 2,714.

*To all whom it may concern:*

Be it known that I, EVERETT A. PANGMAN, a citizen of the United States, residing at Gilboa, in the county of Schoharie and State of New York, have invented certain new and useful Improvements in Shock-Absorber Attachments for Bicycles, of which the following is a specification.

The present invention relates to that type of bicycle attachments that are intended to afford an elastic or yielding connection between the wheels and the supporting frame so that in use upon rough and uneven roads, said connection will absorb nearly the whole of the jar and but very little of the same will be imparted to the rider-supporting frame of the bicycle.

The present improvement has for its object to provide a simple and effective means whereby the independent movement of a supporting wheel with relation to the bicycle frame is so governed that the same will take place in the proper plane without any possibility of buckling or moving in a lateral or oblique manner.

As a further object of the invention, I contemplate an attachment which may be readily applied to the supporting frame of a bicycle as at present constructed, the application being made without in any way altering or modifying the structural details of the said frame.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Fig. 2 is a plan view of the spring connection between the front wheel axle and the rider-supporting frame;

Fig. 3 is a section on the line 3—3 of Fig. 2;

Fig. 4 is a section on the line 4—4 of Fig. 3;

Fig. 5 is a section on the line 5—5 of Fig. 3;

Fig. 6 is an enlarged side elevation of the spring connection between the rear wheel axle and the rider-supporting frame; and Fig. 7 is an enlarged section on the line 7—7 of Fig. 6.

Figure 1:
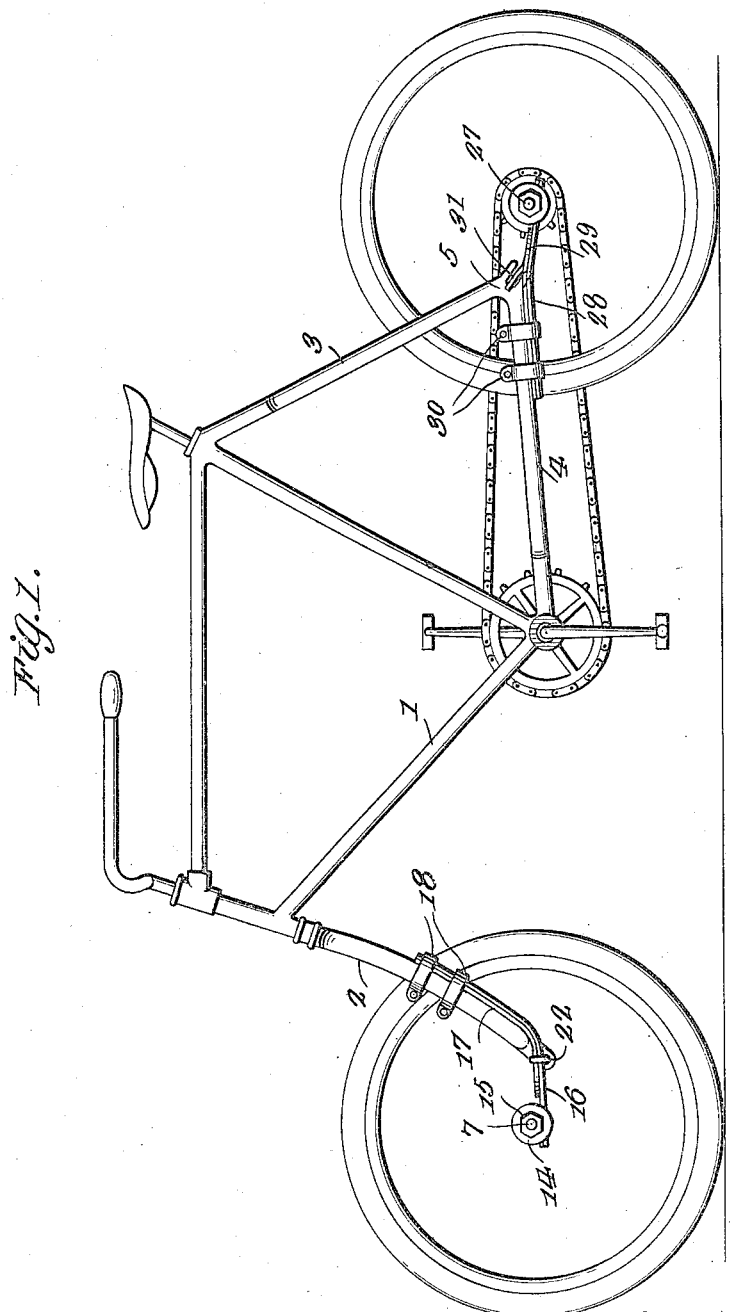
Figure 1 is a side elevation of a bicycle equipped with my improved shock absorbing attachment.

Before proceeding with the description of the drawings, I desire to call particular attention to the fact that while I have evolved my invention with reference to its use in connection with a bicycle, the same may be readily utilized, and in a like capacity, in connection with motor cycles and such other two wheel vehicles as may be conceived.

Referring now to the drawings by numerals, 1 designates as an entirety the rider-supporting or bicycle frame, the same comprising the usual forward forked portion 2, rear seat supporting forked portion 3 and the horizontally disposed forked portion 4, the latter two forked portions converging in a manner common to the art at a point designated 5, the said forked portions being extended and bifurcated as indicated at 6. Although the spring connection between the forward wheel axle and the supporting frame 1 is somewhat different from the spring connection between the rear wheel axle and the said supporting frame, the principle involved is substantially the same.

The forward wheel axle 7, as shown to advantage in Fig. 4, is of a relatively greater length than the forward wheel axle now in general use. Said axle 7 is equipped with the usual hub member 8 and cone adjusting nuts 9. Against each nut 9 a suitable washer 10 is fitted. The extended portions of the axle 7 are screw threaded as indicated at 11 to provide for the arrangement of an elongated lock nut 12 therein, the lock nut being adjustable toward and from the respective washers 10. Each lock nut 12 is provided with a polygonal extension 13 over which extension is fitted a second washer 14, the washer 14 being the same in size as the washer 10. To hold the washer 14 in place, I provide a nut 15, the said nut being threaded on the extended portion of the axle 7 as shown.

A separate spring connection is made between each arm or extension of the forward forked portion 2 of the bicycle frame and the axle 7, and in view of the fact that each spring connection is the same, the detail description of but one of said connections will ensue.

Parallel and contiguous spring plates 16 and 17 are fastened to an arm of the forked portion 2, suitable clamping bands serving as the fastening means. A band 18 embraces the arm and the plates, said plates being cut away as indicated at 19 to receive the bands 18, whereby longitudinal movement of said bands 18 is precluded. Any number of clamping bands may be used. Said plates 16 and 17 are bent at a point intermediate their ends or as shown to advantage in Fig. 3, the respective plates being provided with alined openings 20 and 21, through which openings the said arms of the forked portion 2 extend. To maintain the plates 16 and 17 in a desired position subsequent to a bending thereof, a suitable hook-shaped member 22 is passed through an opening 23 therefor in the arm, the hooked end of the member 22 being arranged over the respective plates and so held by a nut 24 threaded on the member. A second hook-shaped member 25 is carried by the member 22, the said member 25 with the hook terminal of the member 22 effectually holding and supporting the plates 16 and 17 in such relation to the arm of the forked portion 2 as to cause the latter to move therewith.

Plate 17 is of a relatively shorter length than the plate 16, the extended portion of the latter plate being affixed to the forward axle 7 of the bicycle through the medium of a bracket 26 secured to the plate and arranged over and upon the lock nut 12 mounted on that terminal of the axle to which the said plate is secured. The bracket 26 is held against lateral or longitudinal movement relatively to the axle by its engagement with the washers 10 and 14 noted above.

Passing on to a detail description of the spring connection between the supporting frame 1 and the rear wheel axle, 27 designates the axle, which, although not shown in the drawings, is the same in its construction as the forward axle 7. Contiguous spring plates 28 and 29 are fastened to the forked portion 4 of the bicycle frame in a manner similar to the fastening referred to above, suitable clamping bands 30 being arranged over each arm or extension of the forked portion 4. The shorter plates 29 of the rear spring connection are longitudinally slit whereby to provide for an upstruck portion 31 which, as shown to advantage in Fig. 6, is adapted to fit the bifurcation 6 of the bicycle frame to effectually maintain the spring connection against lateral displacement and at the same time effectually brace the connection when subjected to the stress and strain incident to its use. An opening 32 is formed in the lower plate member 28 to provide for movement of the plate relatively to the frame when in use. A bracket 33 is affixed to the extended portion of the plate 28 in much the same manner as the bracket 26 aforesaid, the said bracket 33 being arranged over and upon the lock nut mounted on the rear axle 27. As suggested, each arm or extension of the forked portion 4 is equipped with a spring connection, the respective spring connections being directly affixed to the respective terminals of the rear axle 27.

From the foregoing, taken in connection with the accompanying drawings it will be noted that all shock and jar created by movement of the bicycle over roads having inequalities therein will be absorbed by the spring connection noted above, the said connection permitting vertical movement of both the front and rear wheels of the vehicle without causing a corresponding movement to be imparted to the rider-supporting frame.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a shock absorber attachment for bicycles, a resilient element for each prong of the front and rear forks comprising superposed resilient plates, means for clamping the plates to the prongs at points substantially intermediate the ends of the prongs, said plates lying in contiguous relation to and in contact with the prongs, means on the extremities of the prongs for securing the plates thereto, and bearings on the free ends of the plates to receive the supporting wheel axles.

2. In a shock absorber attachment for bicycles, a resilient element for each prong of the front and rear forks comprising superposed resilient plates, circular clamps embracing the prongs for securing the plates thereto at points substantially intermediate the ends of the prongs, said plates lying in contiguous relation to and in contact with the prongs, bolts extending through the extremities of the prongs and having one terminal of each curved to engage the plates, hook members applied to the bolts for engaging the plates at the opposite edges thereof, nuts applied to the bolts for securing said hook members in place, and bearings on the free ends of the plates to receive the supporting wheel axles.

3. In a shock absorber attachment for bicycles, a resilient element for each prong of the front and rear forks comprising superposed resilient plates, means for clamping the plates to the prongs at a point substantially intermediate the ends of the prongs, said plates lying in contiguous relation to and in contact with the prongs with the lower terminals of said plates extended forwardly at points adjacent the extremities of the prongs, means on the extremities of the prongs for securing the plates thereto, and means on the free extremities of the plates for mounting the supporting wheels.

In testimony whereof I affix my signature in presence of two witnesses.

EVERETT A. PANGMAN.

Witnesses:
PAUL C. STRYKER,
C. D. WYCKOFF.

Copies of this patent may be obtained for five cents each, by addressing the "Commissioner of Patents, Washington, D. C."